United States Patent
Edwards et al.

(10) Patent No.: US 9,663,634 B2
(45) Date of Patent: May 30, 2017

(54) SCRATCH RESISTANT POLYMERS (71) Applicant: TenasiTech Pty Ltd, Brisbane, Queensland (AU)

(72) Inventors: Grant Arthur Benson Edwards, Springwood (AU); Darren Martin, St Lucia (AU)

(73) Assignee: TENASITECH PTY LTD, Brisbane, Queensland (AU)

( * ) Notice: Subject to any disclaimer, the term of this patent is extended or adjusted under 35 U.S.C. 154(b) by 0 days.

(21) Appl. No.: 14/895,907

(22) PCT Filed: Jun. 5, 2014

(86) PCT No.: PCT/AU2014/050062
§ 371 (c)(1),
(2) Date: Dec. 3, 2015

(87) PCT Pub. No.: WO2014/194380
PCT Pub. Date: Dec. 11, 2014

(65) Prior Publication Data
US 2016/0122514 A1    May 5, 2016

(30) Foreign Application Priority Data
Jun. 6, 2013  (AU) .............................. 2013902050

(51) Int. Cl.
C08K 9/04     (2006.01)
C08J 3/22     (2006.01)
C08J 5/18     (2006.01)

(52) U.S. Cl.
CPC ............. *C08K 9/04* (2013.01); *C08J 3/226* (2013.01); *C08J 5/18* (2013.01); *C08J 2333/12* (2013.01); *C08K 2201/013* (2013.01)

(58) Field of Classification Search
CPC .................................. C08K 9/04; C08J 3/226
USPC ................... 523/210, 216, 351; 524/262
See application file for complete search history.

(56) References Cited

U.S. PATENT DOCUMENTS 5,952,093 A     9/1999 Nichols et al.
2011/0060072 A1  3/2011 Martin et al.

FOREIGN PATENT DOCUMENTS

WO    WO 03/014216 A1    2/2003

OTHER PUBLICATIONS

Dasari et al., "Orientation and the extent of exfoliation of clay on scratch damage in polyamide 6 nanocomposites," *Nanotechnology*, vol. 19, pp. 1-14 (2008).
Mohamadpour et al., Anti-scratch and adhesion properties of photo-curable polymer/clay nanocomposite coatings based on methacrylate monomers, *Scientia Iranica, Transactions F: Nanotechnology*, vol. 18, (3) pp. 765-771 (2011).
Supplementary European Search Report issued in European Patent Application No. 14807076.6, dated Feb. 9, 2017, in 5 pages.

*Primary Examiner* — Edward Cain
(74) *Attorney, Agent, or Firm* — Knobbe, Martens, Olson & Bear LLP (57) ABSTRACT

The present invention relates to a polymer composition having improved scratch resistance properties, the composition comprising (i) one or more polymers with a glass transition temperature (Tg) of at least 25° C., and (ii) solid particulate material having a surface modified with an organic modifier of formula (I), an organic modifier of formula (I) being the only organic modifier used to modify a surface of the solid particulate material, wherein the solid particulate material is distributed at least throughout a surface layer of the one or more polymers, and wherein the improved scratch resistance is relative to that of the one or more polymers absent the distributed particulate material, (I) where R is selected from a quaternary ammonium cation, a quaternary phosphonium cation, and imidazolium cation and a pyridinium cation; x is an integer ranging from 1-5; Ry is selected from OH, C(O)OH, NH2, SH and CH3; and Z is a counter anion.

19 Claims, 4 Drawing Sheets

SCRATCH RESISTANT POLYMERS

CROSS-REFERENCE TO RELATED APPLICATIONS

This application is the U.S. National Phase under 35 U.S.C. §371 of International Application PCT/AU2014/050062, filed Jun. 5, 2014, which claims priority to AU 2013902050, filed Jun. 6, 2013.

FIELD OF THE INVENTION

The present invention relates in general to polymer compositions having improved scratch resistant properties, and also to a method of improving the scratch resistance properties of polymer compositions. The invention further relates to products comprising the polymer composition.

BACKGROUND OF THE INVENTION

Polymers are used in numerous applications where aesthetic appearance is important. Indeed, the commercial success of many articles depend upon their aesthetic appeal. Despite having numerous advantageous properties such as being relatively inexpensive, light weight and mouldable, in contrast with other materials such as metals and ceramics, many polymers have limited surface hardness and are prone to surface scratching.

Articles presenting polymer with surface scratches can not only negatively impact on consumer appeal, but the function of the article can also be adversely affected. For example, the application of polymers used in optical devices can be adversely affected by surface scratches.

Accordingly, there remains an opportunity to develop polymer compositions that exhibit improved scratch resistance properties.

SUMMARY OF THE INVENTION

The present invention provides a polymer composition having improved scratch resistance properties, the composition comprising (i) one or more polymers with a glass transition temperature (Tg) of at least 25° C., and (ii) solid particulate material having a surface modified with an organic modifier of formula (I), an organic modifier of formula (I) being the only organic modifier used to modify a surface of the solid particulate material, wherein the solid particulate material is distributed at least throughout a surface layer of the one or more polymers, and wherein the improved scratch resistance is relative to that of the one or more polymers absent the distributed particulate material, where R is selected from a quaternary ammonium cation, a quaternary phosphonium cation, and imidazolium cation and a pyridinium cation; x is an integer ranging from 1-5; $R^y$ is selected from OH, C(O)OH, $NH_2$, SH and $CH_3$; and Z is a counter anion.

The present invention also provides a method of improving scratch resistance properties of a polymer composition, the polymer composition comprising one or more polymers with a glass transition temperature (Tg) of at least 25° C., the method comprising distributing at least throughout a surface layer of the one or more polymers solid particulate material having a surface modified with an organic modifier of formula (I), an organic modifier of formula (I) being the only organic modifier used to modify a surface of the solid particulate material, wherein the improved scratch resistance is relative to that of the one or more polymers absent the distributed particulate material, where R is selected from a quaternary ammonium cation, a quaternary phosphonium cation, and imidazolium cation and a pyridinium cation; x is an integer ranging from 1-5; $R^y$ is selected from OH, C(O)OH, $NH_2$, SH and $CH_3$; and Z is a counter anion.

It has now been found that solid particulate material having a surface modified with an organic modifier of formula (I) surprisingly and unexpectedly imparts improved scratch resistance properties upon being distributed at least throughout a surface layer of one or more polymers having a Tg of at least 25° C.

Without wishing to be limited by theory, it is believed that an organic modifier of formula (I) facilitates highly efficient distribution of the solid particulate material throughout at least the surface layer of the one or more polymers which in turn is believed to promote a surface hardening effect and consequently improved scratch resistance properties.

While it is known that organic modifiers can be used to facilitate the distribution of solid particulate material within a polymeric matrix, organic modifiers of formula (I) used in accordance with the invention have surprisingly and unexpectedly been found to facilitate distribution of solid particulate material in polymers having a Tg of greater than 25° C. so as to impart improved scratch resistance properties to the polymer.

According to the present invention, organic modifiers of formula (I) are employed as the sole organic modifier for the particulate material. Use of an organic modifier of formula (I) as the sole organic modifier has been found to be particularly effective and surprisingly provides for superior scratch resistance properties relative to using other modifiers or a combination of an organic modifier of formula (I) with another modifier.

The form of the organic modifier of formula (I) can advantageously be varied depending upon the nature of the one or more polymers employed. For example, the functional group profile of the modifier can be varied to be more compatible with the one or more polymers used.

In one embodiment of the method, the solid particulate material is distributed throughout at least a surface layer of the one or more polymers by or as a result of the solid particulate material being melt processed together the one or more polymers.

In another embodiment of the method, the solid particulate material is distributed throughout at least a surface layer of the one or more polymers by or as a result of the solid particulate material being mixed with a liquid comprising the one or more polymers dissolved in a solvent.

In a further embodiment of the method, the solid particulate material is distributed throughout at least a surface layer of the one or more polymers by or as a result of the solid particulate material being present within an aqueous dispersion of the one or more polymers.

In yet a further embodiment of the method, the solid particulate material is distributed throughout the one or more polymers by or as a result of the solid particulate material being combined with monomer that is polymerised to form at least one of the one or more polymers.

Various types of polymer and solid particulate material can advantageously be used in accordance with the invention.

In one embodiment, the one or more polymers is a polyacrylate.

In a further embodiment, the solid particulate material is solid nano-particulate material.

Further aspects and embodiments of the invention appear below in the detailed description of the invention.

BRIEF DESCRIPTION OF THE DRAWINGS

The invention will herein be described with reference to the following non-limiting drawings in which.

DETAILED DESCRIPTION OF THE INVENTION

Polymer compositions in accordance with the invention exhibit improved scratch resistance properties. The improved scratch resistance is relative to that of the one or more polymers absent the distributed particulate material. Provided an increase in scratch resistance properties can be measured, there is no particular limitation on the degree by which the scratch resistance is to be improved.

In one embodiment, the polymer composition exhibits scratch resistance properties that are improved by at least 10%, or at least 20%, or at least 30%, or at least 40%, or at least 50%, or at least 60%, or at least 70%, or at least 80%, or at least 90%, or at least 100%, or at least 110%, or at least 120%, or at least 130%, or at least 140%, or at least 150%, or at least 160%, or at least 170%, or at least 180%, or at least 190%, or at least 200%, or at least 210%, or at least 220%, or at least 230%, or at least 240%, or at least 250%, or at least 260%, or at least 270%, or at least 280%, or at least 290%, or at least 300%, or at least 310%, or at least 320%, or at least 330%, or at least 340%, or at least 350%, or at least 360%, or at least 370%, or at least 380%, or at least 390%, or at least 400%, relative to that of the one or more polymers absent the distributed particulate material.

In a further embodiment, the polymer composition exhibits improved scratch resistance ranging from 100% to 500%, or from 100% to 400%, relative to that of the one or more polymers absent the distributed particulate material.

As used herein, the expression "scratch resistance" is intended to mean that which is measured according to ISO 4586-2 where the test sample used is disc-shaped with a 50 mm diameter and a 3 mm thickness, and the probe used has the tip dimensions (see scheme 1 below):

Scheme 1: Schematic illustration of the probe tip (left) and test sample (right) dimensions used to measure scratch resistance.

The scratch resistance test is then carried out using a MTM2 mini traction tribometer (PCS instruments), operated at 50 mm/min rotation speed and using a linear load increase on the probe of 0.25N/min. The point of scratch is determined by a sharp increase in the frictional force also measured on the sample.

It will be appreciated that the improved scratch resistance of the composition is provided at least by the surface layer of the one or more polymers throughout which the solid particulate is distributed.

In addition to exhibiting improved scratch resistance properties, polymer compositions in accordance with the invention can also advantageously exhibit a relatively low reduction in impact strength. Those skilled in the art will appreciate that polymer compositions comprising distributed solid particulate material are often prone to exhibiting a marked decrease in impact strength relative to that of the polymer absent the distributed particulate material. Surprisingly, polymer compositions in accordance with the invention can exhibit an increase in scratch resistance properties while at the same time only a small reduction in impact strength.

In one embodiment, the polymer composition exhibits an impact strength of no less than 75%, 76%, 78%, 80%, 82%, 84%, 86%, 88%, 90%, 92%, 94%, 96%, or 98% of that of the one or more polymers absent the distributed particulate material.

In a further embodiment, the polymer composition according to the invention exhibits an impact strength that is the same or no less than 80% of that of the one or more polymers absent the distributed particulate material.

As used herein, the expression "impact strength" is intended to mean that which is measured according to ASTM D6110.

The one or more polymers used in accordance with the invention has/have a glass transition temperature (Tg) of at least 25° C.

As used herein, the expression "glass transition temperature" is intended to mean that which is measured by differential standing calorimetry (DSC) according to ASTM D3418.

Without wishing to be limited by theory, it is believed that the Tg of a polymer plays an important role in realisation of the present invention. By having a Tg of at least 25° C. the polymers used in accordance with the invention are believed to present a sufficiently hard and glassy state that can synergistically interact with the distributed particulate material to afford the improved scratch resistance properties.

The polymer composition will comprise the one or more polymers with a glass transition temperature (Tg) of at least 25° C. in a amount such that its surface is sufficiently hard and glassy for scratching to be a relevant problem.

Generally, the polymer composition will comprise the one or more polymers with a glass transition temperature (Tg) of at least 25° C. in a amount of at least 60 wt. %, or at least 70 wt. %, or at least 80 wt. %, or at least 90 wt. %, or at least 95 wt. %, or 100 wt. %, relative to the total polymer content of the composition.

In one embodiment, the polymer composition will only comprise one or more polymers with a glass transition temperature (Tg) of at least 25° C. In that case, the invention provides for a polymer composition of one or more polymers with a glass transition temperature (Tg) of at least 25° C. having improved scratch resistance properties.

Provided that the one or more polymers have a Tg of at least 25° C., there is no particular limitation on the type of polymer that may be used in accordance with the invention.

As will be discussed in more detail below, it can be convenient to define such polymers in terms of either having polar or non-polar character.

Examples of polymers suitable for use in accordance with the invention that have polar character include, but are not limited to, polyacrylates such as polyacrylic acid, polymethylacrylate, polymethylmethacrylate, polyethylacrylate, polyethylmethacrylate, polybutylacrylate, polybutylmethacrylate, poly2-ethylhexylacrylate, polyhydroethylmethacrylate and copolymers thereof, polyesters such as polyethylene terephthalate, polybutylene terephthalate, polyethylene naphthalate, and copolymers thereof, polycarbonates such as polycarbonate of bisphenol A, and polyamides such as nylon (e.g. nylon 6, nylon 66, nylon 6/66, and nylon 66/610).

Examples of polymers suitable for use in accordance with the invention having non-polar character include, but are not limited to, polyolefins such as polyethylene, polypropylene and copolymers thereof, and polystyrene.

In one embodiment, the one or more polymers are selected from polyacrylates. In a further embodiment, the one or more polymers is polymethylmethacrylate (PMMA).

A diverse array of solid particulate material may be used in accordance with the invention provided that they can (i) have a surface modified with an organic modifier of formula (I), and (ii) be distributed at least throughout a surface layer of the one or more polymers.

In one embodiment the solid particulate material exhibits cation exchange capacity (CEC) to facilitate surface modification with the organic modifier of formula (I). There is no particular limitation on the level of CEC that the particulate material can exhibit. For example, the CEC may range from about 25 to about 200 meq/100 g, or from about 50 to about 150 meq/100 g, or from about 90 to about 130 meq/100 g.

Suitable solid particle materials include, but are not limited to, metal oxides, metal phosphonates, carbon or boron nanotubes or fibres, layered silicates, layered double hydroxides, or combinations thereof.

Provided that the solid particulate material facilitates imparting the required improved properties of the one or more polymers, there is no particular limitation concerning the geometric attributes of the particulate material.

Generally, the solid particulate material will be in the form of particles that all have height, length and width dimensions that are each less than about 2,000 nm.

By "height, length and width dimensions" is meant that the particles are in effect three dimensional objects by virtue of presenting dimensions in the x, y and z directions of a standard three dimensional axis. The height of small particles is sometimes alternatively known as the particles thickness.

In one embodiment, the solid particulate material is in the form of particles that all have height, length and width dimensions that are each less than about 500 nm, or 400 nm, or 300 nm, or 200 nm, or 100 nm.

In a further embodiment, the solid particulate material is solid nano-particulate material. By the expression "nano-particulate material" is meant particles having at least one height, length or width dimension in the order of 100 nm or less.

In another embodiment, the solid particulate material is solid nano-particulate material having all dimensions (i.e. height, length and width) that are about 100 nm or less.

In a further embodiment, the solid particulate material is solid nano-particulate material having all dimensions (i.e. height, length and width) that are about 50 nm or less.

In yet a further embodiment, the solid particulate material is solid nano-particulate material where the particles have a height or thickness dimension that is less than 20 nm, or less than 15 nm, or less than 10 nm, or less than 8 nm, or less than 6 nm, or less than 4 nm, or less than 2 nm.

When selecting the geometric attributes of the solid particulate material, it can also be convenient to refer to the aspect ratio of the particles. As used herein, the expression "aspect ratio" is intended to define the ratio between the largest dimension and the smallest dimension of the particles.

There is no particular limitation on the aspect ratio of solid particulate material used in accordance with the invention. However, the solid particulate material will generally be anisometric and therefore will have an aspect ratio >1.

In one embodiment, the solid particulate material has an aspect ratio of at least about 2:1, or at least about 5:1, or at least about 10:1, or at least about 100:1. In a further embodiment, the solid particulate material has an aspect ratio ranging from about 5:1 to about 1000:1. In yet a further embodiment, the solid particulate material has an aspect ratio ranging from about 10:1 to about 500:1.

Solid particulate material having such aspect ratios might therefore be conveniently described as having an elongate or platelet-like shape.

For avoidance of any doubt, the geometric attributes of solid particulate material that may be used in accordance with the invention referred to herein are intended to be those which are provided by the particulate material upon being distributed throughout the one or more polymers. In other words, the geometric attributes of the particulate material defined herein relate to those measured when the particulate material is distributed in the one or more polymers and not necessarily that measured from the particulate material per se (which in its natural state may exist in large aggregates or clusters).

By the solid particulate material being "distributed" in the one or more polymers is meant that the particulate material is present as individual particles and/or aggregates thereof in the polymeric matrix of the one or more polymers.

Those skilled in the art will appreciate that solid particulate material may comprise particles having a distribution of geometric attributes. In that case, at least 50 wt %, or at least 60 wt %, or at least 70 wt %, or at least 80 wt %, or at least 90 wt %, of the solid particulate material will have the specified geometric attributes (i.e. the specified height, width and length dimensions and/or aspect ratio). For example, where the solid particulate material is a solid nano-particulate material comprising particles having height, length and width dimensions which are all about 50 nm or less, at least 50 wt %, or at least 60 wt %, or at least 70 wt %, or at least 80 wt %, or at least 90 wt %, or all of the particles have the specified dimensions and/or aspect ratio.

In one embodiment, the solid particulate material is solid nano-particulate material which comprises at least 50 wt %, or at least 60 wt %, or at least 70 wt %, or at least 80 wt %, or at least 90 wt %, of particles having (i) height, length and width dimensions which are all about 50 nm or less, and (ii) an aspect ratio ranging from about 5:1 to about 100:1.

Where solid particulate material used in accordance with the invention does have a particle size distribution, reference to the wt % of particles in the solid particulate material having the specified geometric attributes and/or aspect ratio in most cases will be appropriate to define the required proportion of specified particles.

However, where the solid particulate material being used comprises material made up from particles having different compositions and bulk physical properties such as density (for example as in a mixture of different layered silicates), it may be more appropriate to consider the required proportion of specified particles in terms of number rather than wt %. In that case, the solid particulate material will generally comprise at least 50%, or at least 60%, or at least 70%, or at least 80%, or at least 90%, by number of solid particulate material having the specified geometric attributes and/or aspect ratio.

Geometric attributes of the solid particulate material per se or as distributed in a polymer matrix may be measured using an appropriate microscopy technique such as scanning electron microscopy (SEM) or transmission electron microscopy (TEM). Geometric attributes of the solid particulate material distributed in a polymer matrix and optionally having a particle size distribution may be determined using a method outlined in Fornes, T. D.; Paul, D. R. *Polymer* 2003, 44, 493-5013.

Depending upon the intended application for the polymer composition in accordance with the invention, it may be desirable to provide the solid particulate material having all dimensions less than the wavelength of visible light (i.e. less than about 380 nm). In that case, polymer compositions in accordance with the invention can be made transparent and be particularly suited for use in applications where optical transparency is important.

Those skilled in the art will appreciate there is a diverse array of metal oxide particles that may be used as the solid particulate material in accordance with the invention. Illustrative metal oxides include, but are not limited to, zinc oxide, alumina, silica, zirconia, titania, $Cr_2O_3$, $CeO_2$, and $La_2O_3$.

Likewise, those skilled in the art will appreciate there is a diverse array of metal phosphonates that may be used as the solid particulate material in accordance with the invention. Illustrative metal phosphonates include, but are not limited to, zinc (phosphate-co-phenyiphosphonate), zinc (phosphate-co-octylphosphonate), zinc (phosphate-co-benzylphosphonate), zinc (phosphate-co-decyiphosphonate), calcium (phosphate-co-phenylphosphonate), calcium bis (phenylphosphonate), and magnesium (phosphate-co-decyiphosphonate)

Carbon or boron nanotubes or nanofibres are known in the art and do not need to be described in detail here. Preferred carbon or boron nanotubes or nanofibres are those having a length of less than 100 nm.

As used herein, the term "layered silicate" is intended to be a reference to materials which have as part of their molecular structure sheet sub-structures derived from the $(SiO_4)n^{4-}$ repeat unit. Such materials may also be referred to as a "phyllosilicate", a word having a Latin origin meaning sheet-like silicate. The silica sheets in layered silicates are generally associated with one or more other sheet sub-structures, for example alumina sheets, to provide for a layer which is repeated throughout the material. In an ideal structure, these repeating layers are held together by van der Waals bonds and are separated by an interlayer space which may contain water.

However, in reality the structure of layered silicates is usually more complex as a result of isomorphous substitutions. Thus, in practice, substitution of atoms within the layered silicate structure with atoms having a lower valance state and/or vacancies in the layered structure lattice generally results in a residual negative charge within the layers. This residual negative charge is in turn balanced by the inclusion of cations such as $Na^+$, $K^+$ and $Ca^{2+}$ etc which reside within the interlayer space and give rise to the CEC of layered silicates.

Layered silicates that can be used as the solid particulate material in accordance with the invention may be naturally derived or synthetically prepared. Suitable natural layered silicates include, but are not limited to, smectite clays, such as montmorillonite, saponite, hectorite, mica, vermiculite, bentonite, nontronite, beidellite, volkonskoite, magadite, kenyaite. Suitable synthetic layered silicates include, but are not limited to, synthetic mica, synthetic saponite, synthetic hectorite, synthetic magadite, and synthetic kenyaite. The layered silicates may also have a modified structure, for example as a result of being fluorinated. Examples of fluorinated layered silicates include, but are not limited to, fluorinated montmorillonite, and fluorinated mica.

Suitable layered silicates also include those commonly referred to as 2:1 phyllosilicates. Examples of 2:1 phyllosilicates are selected from natural, synthetic or modified montmorillonite, saponite, bentonite, and mica. Commercially available silicates may be used.

Layered double hydroxides (LDH) are a type of layered material having positively charged layers with charge balancing anions present in the interlayer. These hydroxides may be represented by the formula $[M^{2+}_{1-x}M^{3+}_x(OH)_2]$ $(A_x.yH_2O)$, where $M^{2+}$ and $M^{3+}$ can be most divalent and trivalent metal ions and $A^-$ any type of anion. The term LDH has been taken as a reference name for many isomorphous compounds containing various $M^{II}$ and $M^{III}$ metal cations (i.e. Mg, Zn, Al, Fe) and interlayer anions (i.e. $CO_3$, Cl, $SO_4$) in the LDH structure.

In one embodiment, the solid particulate material used in accordance with the invention is a layered silicate.

Where the solid particulate material used in accordance with the invention is required to have specific geometric attributes that are not inherent to the solid particulate material as sourced, such attributes can be obtained by subjecting the material to a suitable processing means such as milling.

Solid particulate material that can be synthetically prepared can often be made such that it comprises a desired proportion of particles having the required geometric attributes, whereas natural sources of solid particulate material will often require some form of processing in order to render it with a required proportion of particles having the required geometric attributes. For example, some synthetic layered silicates can be prepared with a relatively narrow particle size distribution with a high proportion of particles (ca at least 60 wt %) having a desired geometric shape and size. In contrast, large particle size synthetic or naturally occurring layered silicates may have to be subjected to, for example, a high speed milling or micronising process to achieve a desired proportion of particles having the required geometric attributes.

In one embodiment, the solid particulate material used in accordance with the invention is a layered silicate selected from Lucentite™, hectorite, Laponite™, Cloisite™ fluorohectorite, montmorillonite and fluoromica.

Solid particulate material used in accordance with the invention has its surface modified only with an organic modifier of formula (I):

where R is selected from a quaternary ammonium cation, a quaternary phosphonium cation, and imidazolium cation and a pyridinium cation; x is an integer ranging from 1-5; $R^y$ is selected from OH, C(O)OH, $NH_2$, SH and $CH_3$; and Z is a counter anion.

It is believed the organic modifier of formula (I) exhibits a degree of surface activity toward the solid particulate material and becomes bound to a surface thereof so as to modify the surface properties of the particulate material. By having a surface modified with the organic modifier, the solid particulate material can be more readily distributed throughout polymeric matrix of the one or more polymers.

There is no particular limitation on how an organic modifier of formula (I) binds to the surface of the solid particulate material. In one embodiment, the solid particulate material has a surface that exhibits CEC, and binding of the organic modifier is through a cation exchange mechanism.

Those skilled in the art will appreciate that the organic modifier of formula (I) represents an organic cation molecule, with the cation component being provided by a quaternary ammonium cation, a quaternary phosphonium cation, and imidazolium cation or a pyridinium cation.

In one embodiment, the quaternary ammonium cation has the general formula $R^1R^2R^3$—$N^+$—, where $R^1$, $R^2$, and $R^3$ are each independently selected from $C_1$-$C_{10}$ alkyl. In one embodiment, each of $R^1$, $R^2$, and $R^3$, is a $CH_3$ group.

In a further embodiment, the quaternary phosphonium cation has the formula $R^4R^5R^6P^+$—, where each of $R^4$, $R^5$, and $R^6$ are independently selected from $C_1$-$C_{10}$ alkyl or $C_5$-$C_{12}$ aryl. In one embodiment, $R^4$, $R^5$, and $R^6$ are each a phenyl group.

Where R in formula (I) is a imidazolium cation, the imidazole ring may be covalently bound to the $CH_2$ moiety of formula (I) at either the 1, 2, 3, 4 or 5 ring position. The imidazole ring may also be optionally substituted, for example, with one or more alkyl or aryl groups.

Where R in formula (I) is a pyridinium cation, the pyridine ring may be covalently bound to the $CH_2$ moiety of formula (I) at either the 1, 2, 3, 4, 5 or 6 ring position. The pyridine ring may also be optionally substituted, for example, with an alkyl or aryl group.

The feature "x" in formula (I) is an integer ranging from 1-5, or 1-3. In one embodiment, x is 2.

The group $R^y$ in formula (I) is selected from OH (alcohol), C(O)OH (carboxylic acid), $NH_2$ (amine), SH (thiol) and $CH_3$ (methyl).

In one embodiment $R^y$ is OH.

By being a cation, those skilled in the art will appreciate that an organic modifier of formula (I) will have a counter anion Z (e.g. $Z^-$). The counter anion may be an inorganic or an organic group. In one embodiment, the counter anion is selected from a halide (i.e. $I^-$, $Cl^-$, $Br^-$ and F), hydroxide and acetate.

According to one embodiment, in formula (I) R is a quaternary ammonium cation, x is 2, $R^y$ is OH, and Z is a halide anion.

In a further embodiment, the organic modifier of formula (I) is choline chloride.

The cationic nature of an organic modifier of formula (I) used in accordance with the invention makes it particularly well suited for modifying a surface of layered silicate solid particulate material. In that case the cationic organic modifier can be exchanged with the ion-exchangeable inorganic cations that reside between the layers of the silicate material. By this process, the organic modifier can be inserted (intercalated) between the layers of this silicate material.

Where the solid particulate material used is a layered silicate, provided that an organic modifier of formula (I) can bind to and modify a surface thereof, there is no particular limitation on the CEC of the layered silicate. Generally, the CEC of the layered silicate will range from about 25 to about 200 meq/100 g, or from about 50 to about 150 meq/100 g, or from about 90 to about 130 meq/100 g.

An organic modifier of formula (I) is the only organic modifier used to modify a surface of the solid particulate material. In other words, the invention makes use of solid particulate material having its surface only modified with an organic modifier of formula (I).

The surface of the solid particulate material may be modified with two or more different organic modifiers of formula (I).

The organic modifier of formula (I) may be a polar or a non-polar organic modifier.

In one embodiment, the organic modifier of formula (I) is a polar organic modifier.

In another embodiment, the organic modifier of formula (I) is a non-polar organic modifier.

The polarity characteristics of a given organic modifier of formula (I) will typically be dictated by the polarity characteristics of the one or more polymers used.

The polarity characteristics of the organic modifiers of formula (I) can advantageously be varied depending upon the polarity characteristics of the one or more polymers employed. For example, where the one or more polymers are polar in character it may be desirable to select an organic modifier of formula (I) with polar characteristics, and conversely where the one or more polymers are non-polar in character it may be desirable to select an organic modifier of formula (I) with non-polar characteristics. This can be readily achieved by selecting an appropriate $R^y$ group, where OH, C(O)OH, $NH_2$ and SH will impart polar characteristics to an organic modifier of formula (I), and $CH_3$ will impart non-polar characteristics to an organic modifier of formula (I).

In one embodiment, $R^y$ in formula (I) is selected from OH, C(O)OH, $NH_2$ and SH to provide for a polar organic modifier.

In another embodiment, $R^y$ in formula (I) is selected from $CH_3$ to provide for a non-polar organic modifier.

In further embodiment, only one organic modifier falling within the scope of formula (I) is used to modify any surface of the solid particulate material. In other words, the solid particulate material only has a surface modified with only one organic modifier falling within the scope of formula (I).

According to one embodiment, the solid particulate material only has a surface modified with only one organic modifier of formula (I) where R is a quaternary ammonium cation, x is 2, $R^y$ is OH, and Z is a halide anion.

In a further embodiment, the solid particulate material only has a surface modified with choline chloride.

The solid particulate material used in accordance with the invention is distributed at least throughout a surface layer of the one or more polymers. The solid particulate material is generally distributed substantially uniformly within the polymeric matrix of the one or more polymers throughout at least a surface layer thereof.

Those skilled in the art will appreciate that scratch resistance is a surface phenomenon of a material. The solid particulate material used in accordance with the invention is therefore distributed at least throughout a surface layer of the one or more polymers so as to impart the improved scratch resistance properties.

By a "surface layer" of the one or more polymers is meant a layer from the outermost polymer surface extending inwardly. Provided that improved scratch resistance properties are observed, there is no particular limitation on the thickness of the surface layer through which the solid particulate material is to be distributed. The solid particulate material may of course also be, and in some embodiments is, distributed throughout the entire polymer matrix of the one or more polymers (i.e. not only in a surface layer). For example, it may sometimes be more convenient to distribute the solid particulate material throughout the one or more polymers in preference to only a surface layer of the one or more polymers.

Accordingly, in one embodiment, the solid particulate material is distributed throughout the one or more polymers.

Generally, the solid particulate material will be distributed at least throughout a surface layer of the one or more polymers which has a thickness of at least 10 nm, or at least 50 nm, or at least 100 nm, or at least 200 nm, or at least 300 nm, or at least 400 nm, or at least 500 nm.

It will be appreciated that when the "surface layer" of the one or more polymers in which the solid particulate material is distributed increases in thickness relative to the overall thickness of the one or more polymer article, it may be more convenient to simply describe the solid particulate material as being distributed throughout the one or more polymers per se.

The surface modified solid particulate material will generally be present in an amount of at least 0.1, or at least 0.5, or at least 1, or at least 1.5, or at least 2, or at least 3 wt % relative to the volume of one or more polymer within which the solid particulate material is distributed.

By a specified amount of surface modified solid particulate material being present "relative to the volume of one or more polymer within which the solid particulate material is distributed" is meant that the wt % value is only relative to the volume of polymer within which the particulate material is distributed. For example, if the particulate material is only distributed throughout a surface layer of a given polymer volume, then the wt % value of particulate material present is intended to be relative to that surface layer volume only and not the entire volume of the polymer. Where the solid particulate material is distributed throughout the entire polymer, the wt % of the particulate material will of course in that case be relative to the entire volume of the polymer.

In one embodiment, the surface modified solid particulate material is present in an amount ranging from about 0.5 wt % to 5 wt %, relative to the volume of one or more polymer within which the solid particulate material is distributed.

Where the solid particulate material used has a CEC, the total amount (mol %) of organic modifier used to surface modify the material may be conveniently be expressed as a % of the CEC. In one embodiment, the total amount (mol %) of organic modifier used to surface modify the material represents at least 50%, or at least 60%, or at least 70%, or at least 80%, or at least 90%, or 100% of the CEC of the particulate material.

The improved properties provided by polymer compositions in accordance with the invention are relative to that of the one or more polymers absent the distributed solid particulate material. Without wishing to be limited by theory, it is believed that the organic modifier of formula (I) facilitates highly efficient distribution of the solid particulate material throughout polymer matrix of the one or more polymers. This efficient distribution of the solid particulate material within polymer matrix having a Tg of greater than 25° C. is believed to provide for a synergistic effect that promotes surface hardening and consequently the improved scratch resistance properties to the polymer composition.

According to the method of the invention, the surface modified solid particulate material is distributed at least throughout a surface layer of the one or more polymers. There is no particular limitation on how the surface modified solid particulate material is combined with the one or more polymers to become distributed.

The solid particulate material that is distributed has its surface modified only with an organic modifier of formula (I). Before the surface modified solid particulate material is distributed, the method may first further comprise modifying a surface of solid particulate material with an organic modifier of formula (I). Techniques for modifying a surface of solid particulate material using organic modifiers are known in the art and can advantageously be used in accordance with the invention. For example, such techniques are described in WO 2009/127000. Generally, an organic modifier to be used is dispersed in a liquid and the mixture heated and stirred for a period of time. The solid particulate material may then be introduced into this mixture and again stirred for a period of time.

The resulting mixture is then allowed to cool and the resulting surface modified solid particulate material is washed and dried in preparation for subsequent distribution in the polymer. If required, the surface modified solid particulate material may be milled before being distributed throughout the polymer.

Selecting a particular organic modifier of formula (I) to use in accordance with the invention may vary depending upon the nature of the one or more polymers. Generally, an organic modifier of formula (I) will be selected with the polarity of the one or more polymers in mind. For example, if the one or more polymers are polar in character, then $R^y$ may be selected such that it imparts polar properties to the modifier. In that case, $R^y$ may be selected from OH, C(O)OH, $NH_2$ and SH. If the one or more polymers are non-polar in character, then $R^y$ may be selected such that it imparts non-polar properties to the modifier. In that case, $R^y$ may be selected from $CH_3$. Where polarity considerations of the one or more polymers and the organic modifier are relevant, those skilled in the art will be able to select suitable organic modifies of formula (I) for use with a given polymer(s).

In one embodiment, the surface modified solid particulate material is distributed throughout at least a surface layer of the one or more polymers by melt processing together the one or more polymers and the surface modified solid particulate material. In that case, the solid particulate material will generally be distributed throughout the one or more polymers that are melt processed together with the solid particulate material.

Suitable equipment for melt processing the one or more polymers with the solid particulate material include, but are not limited to, continuous and batch mixers, extruders such as single screw and twin screw extruders, static mixers, cavity transfer mixers and combinations of two or more thereof. The temperature at which melt processing is conducted will vary depending upon the nature of the one or more polymers. Those skilled in the art can readily determine the appropriate temperature at which the melt processing should be conducted. The solid particulate material may be physically mixed with the one or more polymers prior to melt processing, or may be introduced as a separate feed during melt processing.

In another embodiment, the surface modified solid particulate material is distributed throughout at least a surface layer of the one or more polymers by mixing the surface modified solid particulate material with liquid comprising the one or more polymers dissolved in a solvent. Solvent from the resulting liquid composition can then be evaporated to leave the one or more polymers having the solid particulate material dispersed therethrough, for example as in a polymer casting process.

In a further embodiment, the surface modified solid particulate material may be distributed throughout at least a surface layer of the one or more polymers by the surface modified solid particulate material being combined with monomer that is polymerised to form at least one of the one or more polymers. Techniques for polymerising monomers in the presence of solid particulate material are known in the art and can advantageously be used in accordance with the invention. For example, the surface modified solid particulate material may be used in combination with monomer that is polymerised by emulsion polymerisation techniques.

The surface modified solid particulate material that is distributed at least throughout a surface layer of the one or more polymers may itself be provided in the form of a polymer composition comprising the surface modified solid particulate material distributed therein. In that case, the surface modified solid particulate material may be conveniently referred to as being provided in the form of a masterbatch.

Accordingly, in one embodiment of the method the surface modified solid particulate material is provided in the form of a masterbatch, the masterbatch comprising one or more polymers and the solid particulate material having a surface modified with an organic modifier of formula (I). In that case, the method will comprise combining the masterbatch with the one or more polymers with a glass transition temperature (Tg) of at least 25° C. so as to distribute at least throughout a surface layer of the one or more polymers with a glass transition temperature (Tg) of at least 25° C. the solid particulate material having a surface modified with an organic modifier of formula (I).

Generally, the masterbatch will be in the form of a melt processed blend of one or more polymers and the surface modified solid particulate material.

The masterbatch may be used in preparing polymer compositions according to the invention to facilitate distribution of components in the masterbatch throughout a base polymer (which in this case is generally the one or more polymers with a glass transition temperature (Tg) of at least 25° C.), and also to facilitate controlling the concentration of those components within the base polymer. For example, a masterbatch may be provided with a component at a concentration of 10 wt % and the masterbatch diluted five fold within a base polymer to provide a final concentration of that component in the base polymer at 2 wt %.

Where a masterbatch is used in accordance with the method of the invention, it may itself be prepared according to a similar or the same method of the invention. In other words, the masterbatch may be prepared by a method comprising distributing throughout one or more polymers solid particulate material having a surface modified with an organic modifier of formula (I).

When used, a masterbatch may comprise the surface modified solid particulate material in an amount ranging from about 5 wt % to about 40 wt %, or about 5 wt % to about 30 wt %, or about 5 wt % to about 20 wt %, or about 5 wt % to about 15 wt %, relative to the total mass of the masterbatch. The masterbatch may then be let down in one or more base polymers to afford a final concentration of the surface modified solid particulate material in the polymer composition of at least 0.1, or at least 0.5, or at least 1, or at least 1.5, or at least 2, or at least 3 wt % relative to the volume of one or more polymer within which the solid particulate material is distributed.

Generally, polymer used to prepare a masterbatch will be compatible with the base polymer into which the masterbatch is to be let down (which in this case is generally the one or more polymers with a glass transition temperature (Tg) of at least 25° C.). In one embodiment, the masterbatch is prepared using the same one or more polymers as the base one or more polymers in which the masterbatch is to be let down.

In one embodiment, a masterbatch to be used in accordance with the invention is prepared by melt processing one or more polymers with the surface modified solid particulate material.

The polymer composition in accordance with the invention may comprise one or more additives. Suitable additives include antioxidants, light stabilisers, processing aids, pigments, dyes, plasticisers, compatibilisers, dispersing agents, toughening agents, thixotropic agents, metal deactivators, and combinations thereof.

In one embodiment, the composition in accordance with the invention comprise a dispersing agent. By "dispersing agent" is meant an agent that can facilitate dispersing components present in the composition throughout the polymer matrix of the one or more polymers. The dispersing agent is not required to modify the surface of the solid particulate material used according to the invention. Examples of suitable dispersing agents are known to those skilled in the art.

Composition in accordance with the invention comprising a dispersing agent have surprisingly been found to exhibit improved surface gloss relative to compositions absent the dispersing agent.

Polymer compositions in accordance with the invention may present as an entire polymer component of an article or device, or provided in the form of a coating or layer on a component of an article or device. For example, a polymer composition according to the invention may itself be moulded into the shape of the component used in an article or device, or itself be the article or device. Alternatively, a polymer composition according to the invention may be provided as a coating or a layer on a component of a device or article. In either case, the polymer composition will present as a surface layer that imparts improved scratch resistance properties.

Polymer compositions in accordance with the invention may be used in various products, including electronic display screens, optical devices, signage, solar panels, automotive coatings, architectural coatings and white good coatings.

In one embodiment, the composition in accordance with the invention is provided in the form of a sheet, for example a transparent polymer sheet. In a further embodiment, the one or more polymers the make up the sheet is a polyacrylate such as PMMA.

Those skilled in the art will appreciate that polymer provided in the form of sheet is sometimes sold with a removable protective adhesive film on exposed surfaces of the sheet. Once the sheet is in its intended application location the protective film is removed to expose the surface of the polymer sheet. A common problem experienced by installers/users of such plastic sheet is that the upon removal of the protective film the exposed polymer surface is highly prone to surface scratching for about 24 hours. Without wishing to be limited by theory, it is believed that the polymer sheet surface undergoes a hardening phenomenon after the protective film is removed. Nevertheless, the sheet is particularly prone to surface scratching until hardening occurs.

Surprisingly, compositions in accordance with the invention provided in the form of a sheet have been shown to also exhibit improved scratch resistance immediately after a protective film is removed, relative to the same polymer sheet absent the distributed particulate material. In other words, the compositions can advantageously impart improved the scratch resistance even during the window of time when conventional polymer sheets are known to be highly prone to scratching.

In another embodiment, the composition in accordance with the invention is provided in the form of a sheet, the sheet having a removable protective adhesive film on a surface thereof.

As used herein, the term "alkyl", used either alone or in compound words denotes straight chain, branched or cyclic alkyl, preferably $C_{1-20}$ alkyl, e.g. $C_{1-10}$ or $C_{1-6}$ Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

The term "alkenyl" as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term "halogen" ("halo") denotes fluorine, chlorine, bromine or iodine (fluoro, chloro, bromo or iodo).

The term "aryl" (or "carboaryl") denotes any of single, polynuclear, conjugated and fused residues of aromatic hydrocarbon ring systems (e.g. $C_{6-24}$ or $C_{6-18}$). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents as herein defined. The term "arylene" is intended to denote the divalent form of aryl.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl.

The term "heteroatom" or "hetero" as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term "heterocyclylene" is intended to denote the divalent form of heterocyclyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term "heteroarylene" is intended to denote the divalent form of heteroaryl.

The term "acyl" either alone or in compound words denotes a group containing the moiety C=O (and not being a carboxylic acid, ester or amide) Preferred acyl includes C(O)—$R^e$, wherein $R^e$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenyl acetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; aryl sulfonyl such as phenyl sulfonyl and napthylsulfonyl; heterocycliccarbonyl; heterocyclicalkanoyl such as thienylacetyl, thienylpropanoyl, thienylbutanoyl, thienylpentanoyl, thienyl hexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^e$ residue may be optionally substituted as described herein.

The term "sulfoxide", either alone or in a compound word, refers to a group —S(O)$R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl.

The term "sulfonyl", either alone or in a compound word, refers to a group S(O)$_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term "sulfonamide", either alone or in a compound word, refers to a group S(O)NR$^f$R$^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In one embodiment at least one $R^f$ is hydrogen. In another embodiment, both $R^f$ are hydrogen.

The term, "amino" is used here in its broadest sense as understood in the art and includes groups of the formula NR$^a$R$^b$ wherein R$^a$ and R$^b$ may be any independently selected from hydrogen, alkyl, alkenyl, alkynyl, aryl, carbocyclyl, heteroaryl, heterocyclyl, arylalkyl, and acyl. R$^a$ and R$^b$, together with the nitrogen to which they are attached, may also form a monocyclic, or polycyclic ring system e.g. a 3-10 membered ring, particularly, 5-6 and 9-10 membered systems. Examples of "amino" include $NH_2$, NHalkyl (e.g. $C_{1-20}$alkyl), NHaryl (e.g. NHphenyl), NHaralkyl (e.g. NHbenzyl), NHacyl (e.g. NHC(O)$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula C(O)NR$^a$R$^b$, wherein R$^a$ and R$^b$ are as defined as above. Examples of amido include C(O)$NH_2$, C(O)NHalkyl (e.g. $C_{1-20}$alkyl), C(O)NHaryl (e.g. C(O)NHphenyl), C(O)NHaralkyl (e.g. C(O)NHbenzyl), C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula $CO_2R^g$, wherein $R^g$ may be selected from groups including alkyl, alkenyl, alkynyl, aryl, carbocyclyl, heteroaryl, heterocyclyl, aralkyl, and acyl. Examples of carboxy ester include $CO_2C_{1-20}$alkyl, $CO_2$aryl (e.g. $CO_2$phenyl), $CO_2$aralkyl (e.g. $CO_2$ benzyl).

As used herein, the term "aryloxy" refers to an "aryl" group attached through an oxygen bridge. Examples of aryloxy substituents include phenoxy, biphenyloxy, naphthyloxy and the like.

As used herein, the term "acyloxy" refers to an "acyl" group wherein the "acyl" group is in turn attached through an oxygen atom. Examples of "acyloxy" include hexylcarbonyloxy (heptanoyloxy), cyclopentylcarbonyloxy, benzoyloxy, 4-chlorobenzoyloxy, decylcarbonyloxy (undecanoyloxy), propylcarbonyloxy (butanoyloxy), octylcarbonyloxy (nonanoyloxy), biphenylcarbonyloxy (eg 4-phenylbenzoyloxy), naphthylcarbonyloxy (eg 1-naphthoyloxy) and the like.

As used herein, the term "alkyloxycarbonyl" refers to a "alkyloxy" group attached through a carbonyl group. Examples of "alkyloxycarbonyl" groups include butylformate, sec-butylformate, hexylformate, octylformate, decylformate, cyclopentylformate and the like. As used herein, the term "arylalkyl" refers to groups formed from straight or branched chain alkanes substituted with an aromatic ring. Examples of arylalkyl include phenylmethyl (benzyl), phenylethyl and phenylpropyl.

As used herein, the term "alkylaryl" refers to groups formed from aryl groups substituted with a straight chain or branched alkane. Examples of alkylaryl include methylphenyl and isopropylphenyl.

In this specification "optionally substituted" is taken to mean that a group may or may not be substituted or fused (so as to form a condensed polycyclic group) with one, two, three or more of organic and inorganic groups, including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloarylalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroayl, nitrocarbocyclyl, nitroacyl, nitroaralkyl, amino ($NH_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, alkylsulphonyloxy, aryl sulphenyloxy, alkyl sulphenyl, aryl sulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formyl alkenyl, formyl alkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonyl alkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate, phosphate, triarylmethyl, triarylamino, oxadiazole, and carbazole groups. Optional substitution may also be taken to refer to where a —$CH_2$— group in a chain or ring is replaced by a group selected from —O—, —S—, —$NR^a$—, —C(O)— (i.e. carbonyl), —C(O)O— (i.e. ester), and —C(O)$NR^a$— (i.e. amide), where $R^a$ is as defined herein.

Preferred optional substituents include alkyl, (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, halo$C_{1-6}$alkyl, cyano, nitro OC(O)$C_{1-6}$ alkyl, and amino), benzyl (wherein benzyl itself may be further substituted e.g., by $C_{1-6}$ alkyl, halo, hydroxy, hydroxy$C_{1-6}$alkyl, $C_{1-6}$ alkoxy, halo$C_{1-6}$ alkyl, cyano, nitro OC(O)$C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyloxy (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. NHC(O)$CH_3$), phenylamino (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro OC(O)$C_{1-6}$alkyl, and amino), replacement of $CH_2$ with C=O, $CO_2H$, $CO_2$alkyl (e.g. $C_{1-6}$ alkyl such as methyl ester, ethyl ester, propyl ester, butyl ester), $CO_2$phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), $CONH_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro OC(O)$C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl) aminoalkyl (e.g., HN $C_{1-6}$ alkyl-, $C_{1-6}$alkylHN—$C_{1-6}$ alkyl- and ($C_{1-6}$ alkyl)$_2$N—$C_{1-6}$ alkyl-), thioalkyl (e.g., HS $C_{1-6}$ alkyl-), carboxyalkyl (e.g., $HO_2CC_{1-6}$ alkyl-), carboxyesteralkyl (e.g., $C_{1-6}$ alkylO$_2$C$C_{1-6}$ alkyl-), amidoalkyl (e.g., $H_2N$(O)C$C_{1-6}$ alkyl-, H($C_{1-6}$ alkyl)N(O)C$C_{1-6}$ alkyl-), formylalkyl (e.g., OHC$C_{1-6}$alkyl-), acylalkyl (e.g., $C_{1-6}$alkyl(O)C$C_{1-6}$ alkyl-), nitroalkyl (e.g., $O_2$N$C_{1-6}$ alkyl-), sulfoxidealkyl (e.g., R(O)S$C_{1-6}$ alkyl, such as $C_{1-6}$ alkyl(O)S$C_{1-6}$ alkyl-), sulfonylalkyl (e.g., R(O)$_2$S$C_{1-6}$ alkyl- such as $C_{1-6}$ alkyl(O)$_2$S$C_{1-6}$ alkyl-), sulfonamidoalkyl (e.g., $_2$HRN(O)S$C_{1-6}$ alkyl, H($C_{1-6}$ alkyl)N(O)S$C_{1-6}$ alkyl-), triarylmethyl, triarylamino, oxadiazole, and carbazole.

The invention will now be described with reference to the following non-limiting examples.

EXAMPLES

Example 1

Materials Used

Synthetic Clays:

WXFN (120 nm) and WXFP (80 nm) are synthetic flurohectorites from Rockwood Additives UK.

Lucentite SWN (50 nm) is a synthetic hectorite from CBC Co. Japan. These are all low aspect ratio synthetic layered silicates.

Surfactants:

Ethoquad O/12 PG from Akzo Nobel.

Choline chloride.
Both single (Ethoquad or choline) and dual (Ethoquad and choline) surface modifications were employed for comparison. Dual modifications were employed in either a 25/75 or 75/25 ratio.

Natural Organoclays (for Commercial Comparison):
  Cloisite 30B (Southern Clay Products, Texas, USA).
  Cloisite 20A (Southern Clay Products, Texas, USA).

Polymers:
  Polymethylmethacrylate (PMMA) carrier Lucite™ (a low molecular weight (high MFI) acrylic used commercially for masterbatching colour and other additives for PMMA).
  PMMA virgin acrylic.

Processes Used

Clay Modification:
All clay modification processes were carried out at 60° C. for 2 hours. Clay loading was at 10% by weight. Type of the clays and modifications are summarised in Table 1.

Step wise description of the process:
1. Single surfactant or dual surfactant ratios were added to preheated water at 60° C. and the solution was allowed to stabilize for 30 minutes with continuous stirring.
2. The clay was then added to the solution and allowed to mix for at least 1 hour.
3. The solution was allowed cool and then washed.
4. The washed organoclay was then dried in the hot air oven, followed by jet-milling.

In the process of clay modification the surfactants were dispersed in water which was generally at elevated temperatures to accelerate reaction kinetics. This was done prior to the addition of any modifiable substrate to ensure the surface modifiers were fully dispersed with the solution. This was done with no excess of surface modifier to ensure the correct deposition on the surface. The substrate was mixed for sufficient time to ensure a high level of modification before the solution was cooled and the substrate was then washed several times and separated from the solution. The resulting material was then dried and milled before use.

TABLE 1

Types of modified clays used

| Modifying ratio (Ethoquad/Choline chloride) | Clay types | (w/w) % organic modifier(s) - via TGA | Abbreviation code |
|---|---|---|---|
| **100 Ethoquad | Hectorite WXFN | 32% | Etho |
|  | Hectorite WXFP | 32% |  |
|  | Lucentite SWN | 33% |  |
| 100 Choline | Hectorite WXFN | 18% | CC |
|  | Hectorite WXFP | 12% |  |
|  | Lucentite SWN | 17% |  |
| **75/25 | Hectorite WXFN | 25% | Emod |
|  | Hectorite WXFP | 19% |  |
|  | Lucentite SWN | 21% |  |
| **25/75 | Hectorite WXFN | 18% | Cmod |
|  | Hectorite WXFP | 17% |  |
|  | Lucentite SWN | 18% |  |
| Cloisite 20A | Cloisite Na+ | 35% | Cloisite 20A |
| Cloisite 30B | Cloisite Na+ | 31% | Cloisite 30B |

**Comparative

Clay Milling:
The surface modified dried clay was passed through a jet-mill to reduce the powder particle size and to assist dispersion.

Drying:
All the materials (modified clays, polymers and dispersing agents) were dried for 5 hours at 50° C. prior to extrusion.

Extrusion/Melt Compounding

Figure 1:
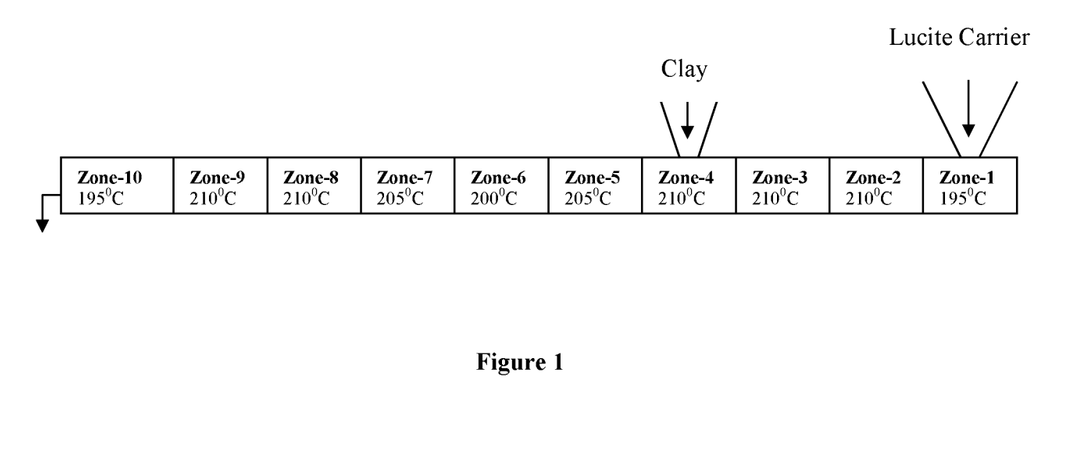
FIG. 1 illustrates extruder temperature profile used for masterbatching.

Masterbatching:
10% masterbatches for all particulate materials listed in Table-1 were prepared in the PMMA carrier Lucite.
Prior to melt processing, all components were dried to ensure minimal water content. The nanofillers were added along the barrel to ensure that they enter at least partially molten Lucite. This ensured superior feeding and dispersion. Extrudate was then collected, pelletised and stored.
The temperature profile employed for masterbatching is shown in Figure-1.

Figure 2:
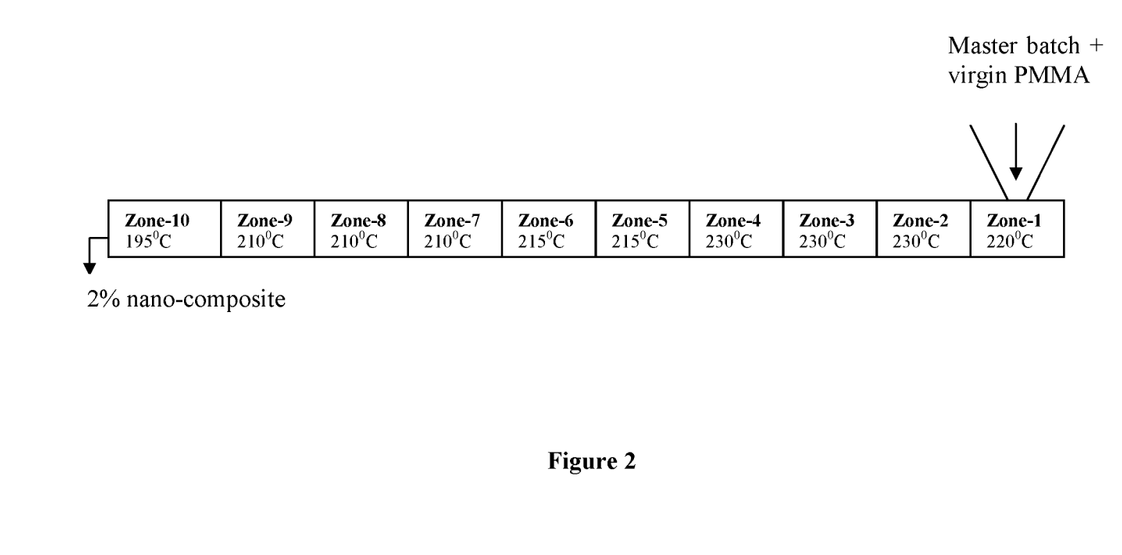
FIG. 2 illustrates extruder temperature profile used in the let down process.

Let Down Process:
Pelletized 10% masterbatches were dried along with virgin PMMA at 50° C. for 5 hrs prior to the processing to ensure minimal moisture was present in the system during processing.
10% master batches were let down into the virgin PMMA to produce 2% (w/w) nanocomposites. The temperature profile used for let down processing is shown in Figure-2.

Characterisation and Testing

PMMA Nanocomposites and Controls:
The polymer nanocomposites prepared by extrusion/melt compounding were compression moulded into test samples and subsequently tested for scratch resistance and impact strength. A control material was composed of an equivalent blend of PMMA+Lucite carrier, with an identical thermal processing history as the nanocomposites.

Figure 3:
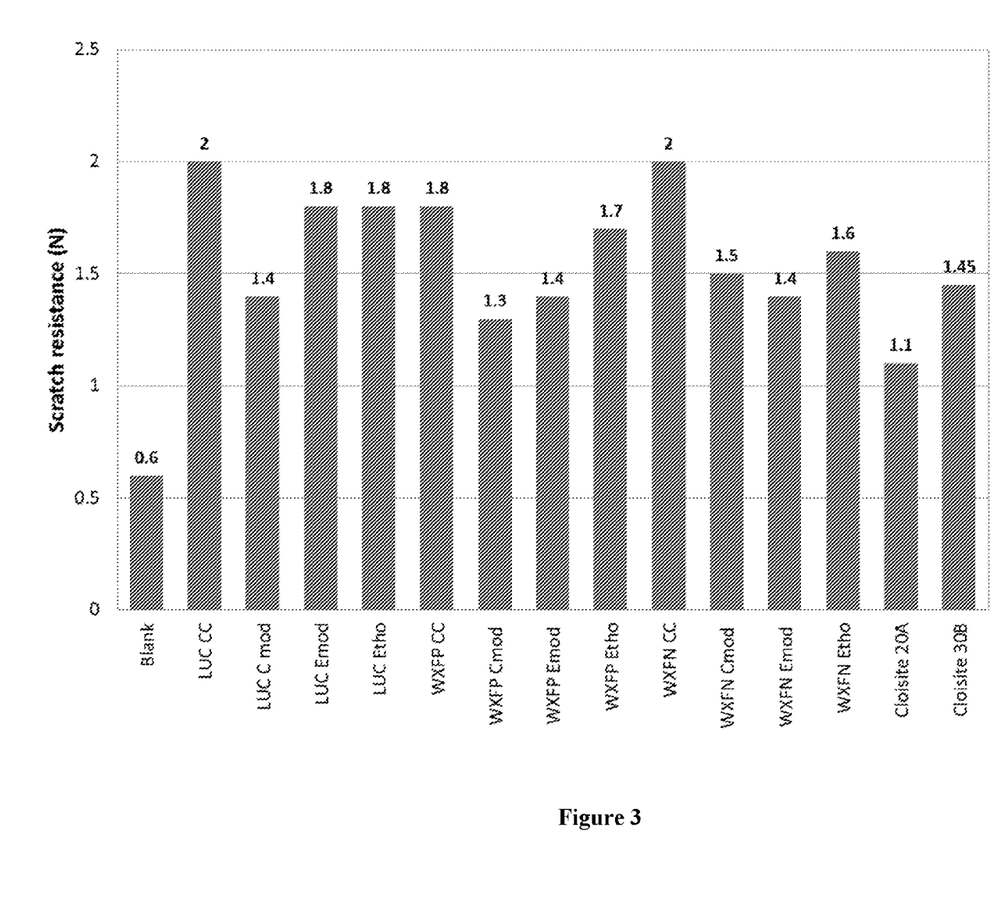
FIG. 3 illustrates a comparison of scratch resistance as a function of clay aspect ratio and surface modification in PMMA nanocomposites.

Scratch Resistance:
The scratch resistance test was measured according to ISO 4586-2 where the test sample used is disc-shaped with a 50 mm diameter and a 3 mm thickness, and the probe used has the tip dimensions (see scheme 1 above). The scratch resistance test is then carried out using a MTM2 mini traction tribometer (PCS instruments), operated at 50 mm/min rotation speed and using a linear load increase on the probe of 0.25N/min. This is a modified version of the Erichsen scratch test, utilizing a tribometer instead of a "free arm weight". The point of scratch is determined by a sharp increase in the frictional force also measured on the sample.
The results obtained are tabulated in the Table 2 and comparison graph shown in the FIG. 3.

TABLE 2

Scratch resistance and impact strength of PMMA nanocomposites.

| Clay | Modification | Code Name | Scratch resistance | Impact strength |
|---|---|---|---|---|
| Lucentite | 100 Choline chloride (CC Mod) | LUC CC Mod | 2 | 186.67 |
|  | **25/75 (C Mod) | LUC C Mod | 1.4 | 125.00 |
|  | **75/25 (E Mod) | LUC E MOD | 1.8 | 126.67 |
|  | **100 ethoquad (Etho Mod) | LUC Etho Mod | 1.8 | 67.67 |
| Hectorite WXFP | 100 Choline chloride (CC Mod) | WXFP CC Mod | 1.8 | 70.00 |
|  | **25/75 (C Mod) | WXFP C MOD | 1.3 | 133.33 |
|  | **75/25 (E Mod) | WXFP E MOD | 1.4 | 110.00 |
|  | **100 ethoquad (Etho Mod) | WXFP Etho MOD | 1.7 | 130.00 |
| Hectorite WXFN | 100 Choline chloride (CC Mod) | WXFN CCMod | 2 | 83.33 |
|  | **25/75 (C Mod) | WXFN CMOD | 1.5 | 176.67 |
|  | **75/25 (E Mod) | WXFN E MOD | 1.4 | 145.33 |
|  | **100 ethoquad (Etho Mod) | WXFN Etho MOD | 1.6 | 86.67 |

TABLE 2-continued

Scratch resistance and impact strength of PMMA nanocomposites.

| Clay | Modification | Code Name | Scratch resistance | Impact strength |
|---|---|---|---|---|
| Cloisite20A | Cloisite 20A | Cloisite 20A | 1.1 | 60.00 |
| Cloisite 30B | Cloisite 30B | Cloisite 30B | 1.45 | 66.67 |
| Control | — | — | 0.6 | 190 |

**Comparative

Figure 4:
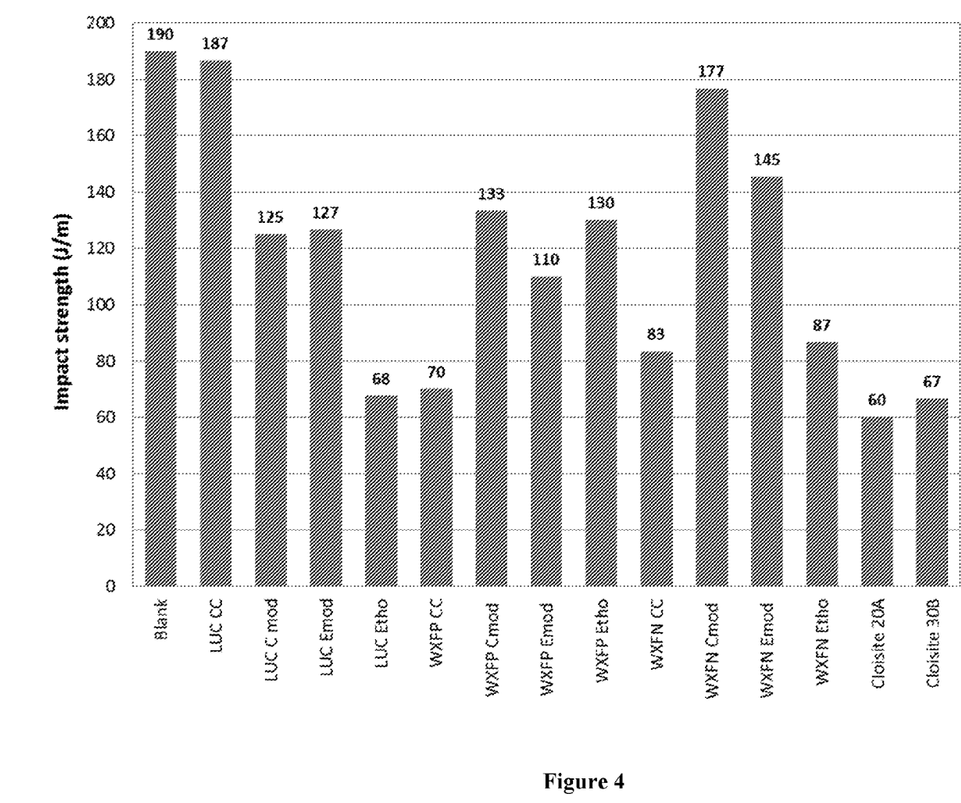
FIG. 4 illustrates a comparison of impact strength as a function of clay aspect ratio and surface modification in PMMA nanocomposites.

Impact Strength:

The impact strength test of the PMMA nanocomposites was conducted according to the standard ASTM D6110. This is commonly known as unnotched Charpy impact test. The results are tabulated in the table-2 and comparison graph shown in Figure-4.

Example 2

Sample made with 50 um acrylic sheet on abs backing, via sheet extrusion. Scratch tested by same method. Samples tested 0 h after removal of protective film and 24 h after removal. Comparing blank acrylic and nanocomposite system containing FN Cmod 0.5% with dispersing agent at 2:1 ratio. Gloss is included for the samples to show no loss in appearance.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. A polymer composition having improved scratch resistance properties, the composition comprising (i) one or more polymers with a glass transition temperature (Tg) of at least 25° C., and (ii) solid particulate material comprising a surface modified with an organic modifier of formula (I), wherein the organic modifier of formula (I) is the only organic modifier used to modify a surface of the solid particulate material, and wherein the solid particulate material is distributed at least throughout a surface layer of the one or more polymers, and wherein the improved scratch resistance is relative to that of the one or more polymers absent the distributed particulate material, $$[R-(CH_2)_x-R^y]Z \quad (I)$$

where R is selected from a quaternary ammonium cation, a quaternary phosphonium cation, an imidazolium cation and a pyridinium cation; x is an integer ranging from 1-5; $R^y$ is selected from OH, C(O)OH, $NH_2$, SH and $CH_3$; and Z is a counter anion.

2. The polymer composition according to claim 1, wherein the organic modifier of formula (I) is a polar organic modifier.

3. The polymer composition according to claim 1, wherein $R^Y$ is selected from OH, C(O)OH, $NH_2$, and SH to provide a polar organic modifier.

4. The polymer composition according to claim 1, wherein the organic modifier of formula (I) is a non-polar organic modifier.

5. The polymer composition according to claim 1, wherein $R^y$ is $CH_3$ to provide a non-polar organic modifier.

6. The polymer composition according to claim 1, wherein the organic modifier of formula (I) is choline chloride.

7. The polymer composition according to claim 1, wherein the one or more polymers are selected from the group consisting of polyacrylates, polyesters, polycarbonates, polyamides, polystyrenes and polyolefins.

8. The polymer composition according to claim 1, wherein the one or more polymers are selected from the group consisting of polyacrylic acid, polymethylacrylate, polymethylmethacrylate, polyethylacrylate, polyethylmethacrylate, polybutylacrylate, polybutylmethacrylate, poly2-ethylhexylacrylate, polyhydroethylmethacrylate, polyethylene terephthalate, polybutylene terephthalate, polyethylene naphthalate, polycarbonate of bisphenol A, nylon, polyethylene, polypropylene, polystyrene and copolymers thereof.

9. The polymer composition according to claim 1, wherein the solid particulate material is selected from metal oxides, metal phosphonates, carbon or boron nanotubes or fibres, layered silicates, layered double hydroxides, or combinations thereof.

10. The polymer composition according to claim 9, wherein the layered silicate is a 2:1 phyllosilicate selected from natural, synthetic or modified montmorillonite, saponite, bentonite, and mica.

11. The polymer composition according to claim 1, wherein the solid particulate material is in the form of particles that all have height, length and width dimensions that are each less than about 100 nm.

12. The polymer composition according to claim 1, wherein the particulate material is a layered silicate, the one or more polymers are polyacrylates, and the organic modifier of formula (I) is a polar organic modifier.

13. The polymer composition according to claim 1 which exhibits an impact strength of no less than 75% of that of the one or more polymers absent the distributed particulate material.

14. A method of improving scratch resistance properties of a polymer composition, the polymer composition comprising one or more polymers with a glass transition temperature (Tg) of at least 25° C., the method comprising distributing at least throughout a surface layer of the one or more polymers solid particulate material having a surface modified with an organic modifier of formula (I), wherein the organic modifier of formula (I) is the only organic modifier used to modify a surface of the solid particulate material, and wherein the improved scratch resistance is relative to that of the one or more polymers absent the distributed particulate material, $$[R-(CH_2)_x-R^y]Z \quad (I)$$

where R is selected from a quaternary ammonium cation, a quaternary phosphonium cation, an imidazolium cation and a pyridinium cation; x is an integer ranging from 1-5; $R^y$ is selected from OH, C(O)OH, $NH_2$, SH and $CH_3$; and Z is a counter anion.

15. The method according to claim 14, wherein the surface modified solid particulate material is distributed throughout at least a surface layer of the one or more polymers by melt processing together the one or more polymers and the surface modified solid particulate material.

16. The method according to claim 14, wherein the surface modified solid particulate material is distributed throughout at least a surface layer of the one or more polymers by mixing together the surface modified solid particulate material and a liquid comprising the one or more polymers dissolved in a solvent.

17. The method according to claim 14, wherein the surface modified solid particulate material is distributed throughout at least a surface layer of the one or more polymers by combining the surface modified solid particulate material with monomer that is polymerised to form at least one of the one or more polymers.

18. The method according to claim 14 in which the solid particulate material having a surface modified with an organic modifier of formula (I) is first provided in the form of a masterbatch, the masterbatch comprising one or more polymers and the solid particulate material, the method comprising combining the masterbatch with the one or more polymers having a glass transition temperature (Tg) of at least 25° C. so as to distribute at least throughout a surface layer of the one or more polymers with a glass transition temperature (Tg) of at least 25° C. the solid particulate material.

19. A transparent polymer sheet comprising a polymer composition according to claim 1.

* * * * *

UNITED STATES PATENT AND TRADEMARK OFFICE
CERTIFICATE OF CORRECTION

PATENT NO. : 9,663,634 B2
APPLICATION NO. : 14/895907
DATED : May 30, 2017
INVENTOR(S) : Grant Arthur Benson Edwards et al.

It is certified that error appears in the above-identified patent and that said Letters Patent is hereby corrected as shown below:

In the Specification

In Column 5 at Line 9, Change "poly2-ethylhexylacrylate," to --poly(2-ethylhexyl acrylate),--.

In Column 7 at Line 39, Change "phenyiphosphonate" to --phenylphosphonate--.

In Column 7 at Line 41, Change "decyiphosphonate)," to --decylphosphonate),--.

In Column 7 at Lines 43-44, Change "decyiphosphonate)" to --decylphosphonate).--.

In Column 8 at Line 9, Change "magadite," to --magadiite--.

In Column 8 at Line 12, Change "magadite," to --magadiite--.

In Column 8 at Line 56, After "Cloisite™" insert --,--.

In Column 12 at Lines 17-22, Delete "The resulting mixture is then allowed to cool and the resulting surface modified solid particulate material is washed and dried in preparation for subsequent distribution in the polymer. If required, the surface modified solid particulate material may be milled before being distributed throughout the polymer." and insert the same on Column 12, Line 16, as a continuation of the same paragraph.

In Column 16 at Line 50, Change "azridinyl," to --aziridinyl,--.

In Column 17 at Lines 14-15, Change "oxadialzolyl," to --oxadiazolyl,--.

In Column 17 at Lines 33-34, Change "phenyl acetyl," to --phenylacetyl,--.

In Column 17 at Line 44, Change "aryl sulfonyl" to --arylsulfonyl--.

Signed and Sealed this
Tenth Day of April, 2018

Andrei Iancu
*Director of the United States Patent and Trademark Office*

Page 1 of 2

CERTIFICATE OF CORRECTION (continued)
U.S. Pat. No. 9,663,634 B2

In Column 17 at Line 44, Change "phenyl sulfonyl" to --phenylsulfonyl--.

In Column 17 at Line 45, Change "napthylsulfonyl;" to --naphthylsulfonyl;--.

In Column 17 at Line 47, Change "thienyl hexanoyl," to --thienylhexanoyl,--.

In Column 18 at Line 47, Change "(eg" to --(e.g.,--.

In Column 19 at Line 15, Change "nitroheteroayl," to --nitroheteroaryl,--.

In Column 19 at Line 20, Change "aryl sulphenyloxy," to --arylsulphenyloxy,--.

In Column 19 at Line 20, Change "alkyl sulphenyl," to --alkylsulphenyl,--.

In Column 19 at Lines 20-21, Change "aryl sulphenyl," to --arylsulphenyl,--.

In Column 19 at Lines 36-37, Change "formyl alkenyl," to --formylalkenyl,--.

In Column 19 at Line 37, Change "formyl alkynyl," to --formylalkynyl,--.

In Column 19 at Line 44, Change "sulfonyl alkyl," to --sulfonylalkyl,--.

In Column 22 at Line 49 (approx.), Below "resistance" insert --(N)--.

In Column 22 at Line 49 (approx.), Below "Strength" insert --(J/M)--.

In Column 23 at Line 38 (approx.), Change "that that" to --that--.

In the Claims

In Column 23 at Line 66, In Claim 3, change "RY" to --$R^Y$--.